Dec. 2, 1930.  E. D. KOHR  1,783,798
MOLD FOR FORMING CONES FOR ICE CREAM AND FROZEN CUSTARD
Filed March 19, 1930
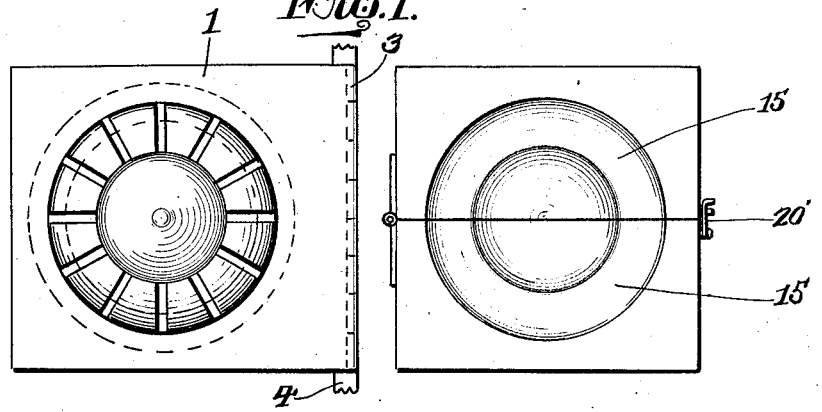
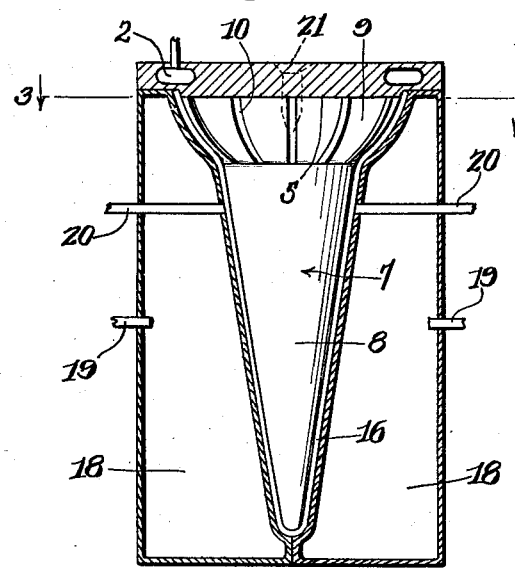
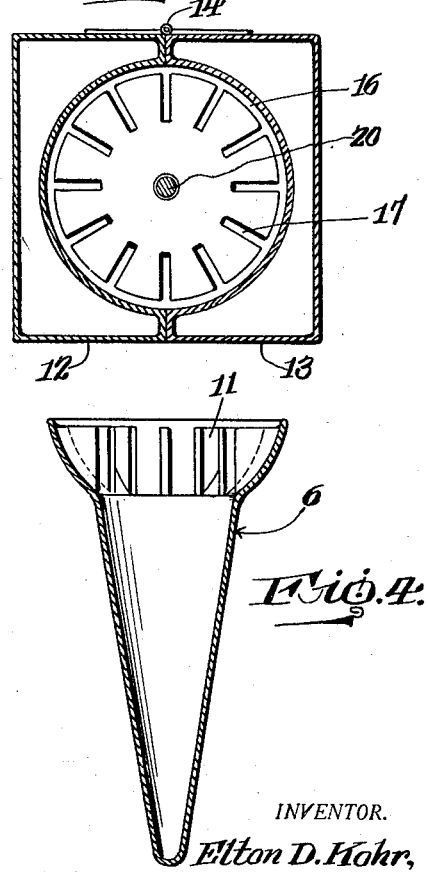
INVENTOR.
Elton D. Kohr,
BY
Geo. P. Kimmel
ATTORNEY.

Patented Dec. 2, 1930

1,783,798

UNITED STATES PATENT OFFICE

ELTON D. KOHR, OF YORK, PENNSYLVANIA

MOLD FOR FORMING CONES FOR ICE CREAM AND FROZEN CUSTARD

Application filed March 19, 1930. Serial No. 437,166.

This invention relates to a mold for producing edible ice cream cones, and has for its object to provide, in a manner as hereinafter set forth, a new, novel, thoroughly efficient, conveniently adjusted mold for producing an ice cream cone provided with means within the upper portion thereof to constitute respectively a seat for the batch or lump of ice cream and channels for directing the melting cream into the body of the cone to prevent dripping from the exterior of the latter.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a plan view of the mold when open.

Figure 2 is a vertical sectional view of the mold when closed to receive the material for the purpose of molding the cone.

Figure 3 is a section on line 3—3, Figure 2.

Figure 4 is a side elevation of a cone produced from the mold.

The mold includes a core, a hinged carrier for the latter, and a body portion formed of a pair of hinged sections having coacting recesses to provide in connection with the core a molding cavity to produce the article from an edible substance. The sections of said body portion are hollow to form a pair of heating chambers for the purpose of cooking the edible material when supplied to the molding cavity.

The carrier, designated at 1, is in the form of a flat, rectangular plate adapted to be hinged at one end, as at 3 to a support 4. The carrier is formed with a heat receiving channel 2 adapted to communicate with a source of heat supply. The lower face of the carrier 1 is formed with a depending, circular enlargement 5 of the desired height and of a diameter less than the width of the carrier. The axis of the enlargement 5 is positioned at a point between the transverse median and non-hinged end of carrier 1. The function of the enlargement 5 will be presently referred to. The carrier 1 not only functions for the carrying of the core, the latter to be presently referred to, but also functions to form the top edge of the cone 6 produced by the mold.

The core is referred to generally at 7, and is of circular cross section and solid. The core 7 includes a tapered part 8 and a substantially flared part 9 of greater diameter than the part 8. The part 9 is of materially less length than the part 8 and forms the upper portion of the core. The part 9 merges at its bottom into the portion of greatest diameter of part 8, such portion of greatest diameter of the part 8 being the upper end thereof. The top of part 9 is of the same diameter as the diameter of the enlargement 5 and registers with the edge of the latter. The part 9 is formed with a series of upstanding, radially disposed notches 10 arranged equi-distant from each other and having the inner walls thereof perpendicular and flush with the point of mergence of the periphery of the part 9 with the periphery of the part 8. The notches 10 are substantially of quadrangular contour and have the tops thereof closed by the enlargement 5, thereby providing when the molding cavity is formed, such cavity to be presently referred to, spaced extensions to form the webs 11 of the cone 6.

The body portion of the mold includes a pair of oppositely disposed hollow sections 12, 13 hinged together as at 14. Each section has its inner face formed with a recess 15. When the inner faces of the sections of the body portion are in abutting relation the recesses 15 register and coact to provide a pocket corresponding to contour to the shape of the core, but of slightly greater diameter throughout than the diameter of the core, whereby when the core is positioned in the pocket and the carrier seated on the body portion a molding cavity 16 having extensions 17 will be provided. The enlargement 5 forms a continuation of the inner wall of the molding cavity. The width of the molding cavity can be as desired and will depend upon the diameter of the core with respect to the diameter of the pocket provided by the coacting recesses 15. The pocket is of greater height than that of the core and extends slightly above and slightly below the core when the latter is positioned in the pocket to provide the molding cavity. The enlargement 5 extends into the upper end of the pocket formed by the recesses 15. The tops of the molding cavity and the notches are closed respectively by the carrier and the enlargement 5.

Each section of the body portion provides a heating chamber 18 into which leads a heating pipe 19 from a suitable source of supply. Each section of the body portion carries a conducting pipe or tube 20 for supplying the material to the molding cavity 16. The sections 12, 13 of the body portion are provided with a suitable latch, as indicated at 20′ for coupling them in abutting relation during the molding operation. The core is connected to the carrier by the holdfast means 21.

Although the walls of the molding cavity are shown plain, yet they can be set up in any manner so as to ornament the periphery of the cone.

After the cone has been molded, the sections 12, 13 are released or shifted away from each other and the carrier is then swung upwardly carrying the core with the cone thereon and after the core has cleared the sections of the body portion the cone is removed from the core.

When the cone is formed, the webs 11 thereof have their top edges positioned below the top edge of the body of the cone.

The cone produced by the mold includes a hollow tapered body portion closed at its bottom and open at its top and having integral with its top a flaring head of materially greater diameter than the largest diameter of the body portion. The shape of the head in cross section is substantially the contour of a cup. Integral with the inner face of the head is a series of spaced, radially disposed, quadrant shaped, upstanding webs 11 coacting to provide a seat for the ice cream lump or batch which is mounted in the cone. As the head extends above the top edges of the webs a stop is provided to prevent the ice cream batch or lump from shifting laterally from off the top of the cone or projecting over the top edge of the head. The webs in connection with the head form channels for directing the melting cream into the body portion of the cone. The construction of cone produced by the mold is such that when the cone is used the outside surface of the cone will be free of drip and therefore the soiling of the fingers or clothes of the purchaser will be prevented.

It is thought the many advantages of a mold in accordance with this invention and for the purpose set forth can be readily understood, and although the preferred embodiment of the invention is as illustrated and described, yet it is to be understood that changes in the details of construction can be had which fall within the scope of the invention as claimed.

What I claim is:

1. A mold for the purpose set forth, a body portion formed of a pair of oppositely disposed hinged sections having coacting means on the inner faces thereof to provide, when said faces are in abutting relation a tapered pocket, a hinged carrier for seating on said body portion and having a depending enlargement extending into the mouth of the pocket, a core abutting said enlargement, depending therefrom and secured to the carrier, said core coacting with the wall of the pocket to provide a molding cavity, and said core having means at its upper end coacting with said enlargement to provide the upper end of the molding cavity with upstanding, spaced extensions.

2. In a mold for the purpose set forth, a body portion formed of a pair of oppositely disposed hinged sections having coacting means on the inner faces thereof to provide, when such faces are in abutting relation a tapered pocket having a flaring upper portion, a carrier for seating on said body portion and having a depending enlargement extending into the mouth of the pocket, a core corresponding in contour to that of the pocket, abutting, registering with and depending from said enlargement for extension into said pocket, said core providing in connection with the wall of the pocket a molding cavity, and said core having means at its upper end coacting with said enlargement to provide the upper end of the molding cavity with upstanding spaced extensions.

3. In a mold for the purpose set forth, a body portion formed of a pair of oppositely disposed hinged sections having coacting means on the inner faces thereof to provide, when such faces are in abutting relation a tapered pocket having a flaring upper portion, a carrier for seating on said body portion and having a depending enlargement extending into the mouth of the pocket, a core corresponding in contour to that of the pocket, abutting, registering with and depending from said enlargement for extension into said pocket, said core providing in connection with the wall of the pocket a molding cavity, said core having means at its upper end coacting with said enlargement to provide the upper end of the molding cavity with upstanding, spaced extensions, and said carrier and said sections having heat receiving means.

4. In a mold for the purpose set forth, a body portion formed of a pair of oppositely disposed hinged sections having coacting means on the inner faces thereof to provide, when such faces are in abutting relation a tapered pocket having a flaring upper portion, a carrier for seating on said body portion and having a depending enlargement extending into the mouth of the pocket, a core corresponding in contour to that of the pocket, abutting, registering with and depending from said enlargement for extension into said pocket, said core providing in connection with the wall of the pocket a molding cavity, said core having means at its upper end coacting with said enlargement to provide the upper end of the molding cavity with upstanding, spaced extensions, and said sections having heat receiving means and means for conducting material to the molding cavity.

5. In a mold for the purpose set forth, a structure having a tapered pocket formed with a flaring upper portion, a tapered core for positioning in said pocket and formed with a flaring upper portion provided with spaced notches disposed lengthwise of the core, a closure for the upper ends of the notches, said core, closure and wall of said pocket coacting to provide a molding cavity having extensions at its upper portion, and means carrying said closure for closing the upper end of said cavity adjacent said extensions.

In testimony whereof, I affix my signature hereto.

ELTON D. KOHR.